United States Patent
Sarkar

(10) Patent No.: US 9,626,318 B2
(45) Date of Patent: Apr. 18, 2017

(54) SYSTEMS AND METHODS FOR STORAGE PROTOCOL COMPLIANCE TESTING

(75) Inventor: Sourin Sarkar, Bangalore (IN)

(73) Assignee: AVAGO TECHNOLOGIES GENERAL IP (SINGAPORE) PTE. LTD., Singapore (SG)

(*) Notice: Subject to any disclaimer, the term of this patent is extended or adjusted under 35 U.S.C. 154(b) by 890 days.

(21) Appl. No.: 13/359,419

(22) Filed: Jan. 26, 2012

(65) Prior Publication Data

US 2013/0198423 A1  Aug. 1, 2013

(51) Int. Cl.
G06F 13/12  (2006.01)
G06F 13/38  (2006.01)

(52) U.S. Cl.
CPC ................ G06F 13/385 (2013.01)

(58) Field of Classification Search
CPC .................................................. G06F 13/385
USPC ........................................................ 710/74
See application file for complete search history.

(56) References Cited

U.S. PATENT DOCUMENTS

| | | |
|---|---|---|
| 4,344,171 A | 8/1982 | Lin et al. |
| 5,524,218 A | 6/1996 | Byers et al. |
| 5,796,938 A | 8/1998 | Emberty |
| 6,061,753 A | 5/2000 | Ericson |
| 6,304,984 B1 | 10/2001 | Neal et al. |
| 6,442,628 B1 | 8/2002 | Bastiani et al. |
| 6,519,718 B1 | 2/2003 | Graham et al. |
| 6,539,503 B1 | 3/2003 | Walker |
| 6,601,119 B1 | 7/2003 | Slutz et al. |
| 6,851,083 B1 | 2/2005 | Hagenauer et al. |
| 6,961,813 B2 | 11/2005 | Grieff et al. |
| 7,003,617 B2 | 2/2006 | Golasky et al. |
| 7,210,065 B2 | 4/2007 | Uddenberg et al. |
| 7,308,397 B2 | 12/2007 | Jibbe et al. |
| 7,360,119 B1 | 4/2008 | Stenfort et al. |
| 7,363,395 B2 | 4/2008 | Seto |
| 7,366,957 B2 | 4/2008 | Paulsen et al. |
| 7,406,628 B2 | 7/2008 | Edgar et al. |
| 7,412,540 B2 | 8/2008 | Seto et al. |
| 7,529,980 B2 | 5/2009 | Henning et al. |
| 7,586,930 B2 | 9/2009 | Koski |

(Continued)

OTHER PUBLICATIONS

LeCroy SAS and SATA Protocol Solutions for Testing and Verification, Copyright 2006 by LeCroy Corp. 6 pages.

(Continued)

*Primary Examiner* — Idriss N Alrobaye
*Assistant Examiner* — Brooke Taylor
(74) *Attorney, Agent, or Firm* — Sheridan Ross P.C.

(57) ABSTRACT

Methods and devices are provided for determining compliance with standards for at least one of Serial Attached SCSI and Serial Advanced Technology Attachment (SAS/SATA). The device comprises PHY layer logic operable to couple the device with another device, and a control unit. The control unit is operable to direct operations of the PHY layer logic, and to determine that the other device is a SAS/SATA device. The control unit is further operable to perform SAS/SATA protocol compliance testing on the other device to determine a degree of compliance of the other device with SAS/SATA protocol standards, and to alter subsequent communications with the other device responsive to determining that the other device is not fully compliant with SAS/SATA protocol standards.

18 Claims, 3 Drawing Sheets

(56) References Cited

U.S. PATENT DOCUMENTS

| | | |
|---|---|---|
| 7,739,432 B1 | 6/2010 | Shaw et al. |
| 7,747,922 B2 | 6/2010 | Mielczarek et al. |
| 7,761,642 B2 | 7/2010 | Stenfort |
| 7,941,575 B2 | 5/2011 | Roy et al. |
| 7,962,676 B2 | 6/2011 | Stenfort |
| 8,065,133 B1 | 11/2011 | Asbridge |
| 2003/0196149 A1 | 10/2003 | Gygi et al. |
| 2003/0236953 A1 | 12/2003 | Grieff et al. |
| 2005/0182874 A1* | 8/2005 | Herz et al. ............ 710/74 |
| 2006/0168273 A1 | 7/2006 | Michael |
| 2007/0192469 A1 | 8/2007 | Gentieu et al. |
| 2007/0226419 A1 | 9/2007 | Roy |
| 2007/0271082 A1 | 11/2007 | Dominguez |
| 2008/0028157 A1 | 1/2008 | Steinmetz |
| 2008/0086576 A1 | 4/2008 | Schauer et al. |
| 2008/0162811 A1 | 7/2008 | Steinmetz |
| 2008/0163005 A1 | 7/2008 | Sonksen et al. |
| 2008/0195912 A1 | 8/2008 | Mende et al. |
| 2008/0215789 A1 | 9/2008 | Matsuda et al. |
| 2008/0247420 A1 | 10/2008 | Marks et al. |
| 2009/0234985 A1 | 9/2009 | Maxwell |
| 2009/0234994 A1 | 9/2009 | Oh et al. |
| 2009/0240986 A1 | 9/2009 | Warren |
| 2010/0146166 A1* | 6/2010 | Gadsing et al. ........... 710/100 |
| 2010/0303085 A1* | 12/2010 | Keeley et al. ............ 370/401 |

OTHER PUBLICATIONS

Zhang et al., "Evaluating Availability of Networked Storages Using Commercial Workloads" Dept. of Electrical and Computer Engineering, University of Rhode Island, Kingston, RI 02881 USA.

\* cited by examiner

SYSTEMS AND METHODS FOR STORAGE PROTOCOL COMPLIANCE TESTING

BACKGROUND

1. Field of the Invention

The invention relates generally to Serial Attached SCSI (SAS) and Serial Advanced Technology Attachment (SATA), and more specifically relates to determining a degree to which a given device complies with SAS and/or SATA protocols.

2. Discussion of Related Art

In electronic systems implementing a SAS and/or SATA (SAS/SATA) topology, it is not uncommon for certain devices of the system to improperly implement portions of the SAS/SATA protocols. This may be the result of sloppy design, simple oversight, or a designer's attempt to streamline the way the device communicates by bypassing certain steps normally specified by SAS/SATA protocols. At start-of-day, these devices are typically detected by the system as SAS/SATA devices because they adequately follow SAS/SATA procedures for discovery and initialization. However, once the devices are operating within the SAS/SATA topology, they may provide unexpected responses to certain types of SAS/SATA communications.

The unexpected responses of the SAS/SATA devices result in several problems for the system implementing the SAS/SATA topology. The first problem is that a communication failure may occur owing to a device's noncompliance (i.e., data may be dropped or misreported during communications). This may harm the overall integrity of the electronic system. Another problem is that even benign errors (for example, skipping an "unnecessary" SAS/SATA protocol step) may cause the SAS/SATA topology to engage in processing-intensive error correction routines each time a protocol violation is detected. This may be true even when the device predictably throws the same protocol violation over and over again. Thus, even if data is not lost, the performance of the system is degraded owing to the device's noncompliance.

Thus it is an ongoing challenge to account for devices that are not fully protocol compliant within a SAS/SATA topology.

SUMMARY

The present invention solves the above and other problems, thereby advancing the state of the useful arts, by providing methods and systems for determining a degree of compliance of a device with SAS/SATA protocols in an operating SAS/SATA topology. Note that herein, the term "SAS/SATA" is used to indicate "at least one of SAS and SATA." Thus, a SAS/SATA device is a device that is compliant with SAS, SATA, or SAS and also SATA.

In one aspect hereof a method is provided, operable in a first device, for determining compliance of a second device with standards for at least one of Serial Attached SCSI and Serial Advanced Technology Attachment (SAS/SATA). The method comprises determining, via the first device, that the second device is a SAS/SATA device. The method also comprises performing, via the first device, SAS/SATA protocol compliance testing on the second device to determine a degree of compliance of the second device with SAS/SATA protocol standards. Further, the method includes altering subsequent communications with the second device responsive to determining that the second device is not fully compliant with SAS/SATA protocol standards.

Another aspect hereof provides a device compliant with standards for at least one of Serial Attached SCSI and Serial Advanced Technology Attachment (SAS/SATA). The device comprises PHY layer logic operable to couple the device with another device, and a control unit. The control unit is operable to direct operations of the PHY layer logic, and to determine that the other device is a SAS/SATA device. The control unit is further operable to perform SAS/SATA protocol compliance testing on the other device to determine a degree of compliance of the other device with SAS/SATA protocol standards, and to alter subsequent communications with the other device responsive to determining that the other device is not fully compliant with SAS/SATA protocol standards.

DETAILED DESCRIPTION OF THE DRAWINGS

Figure 1:
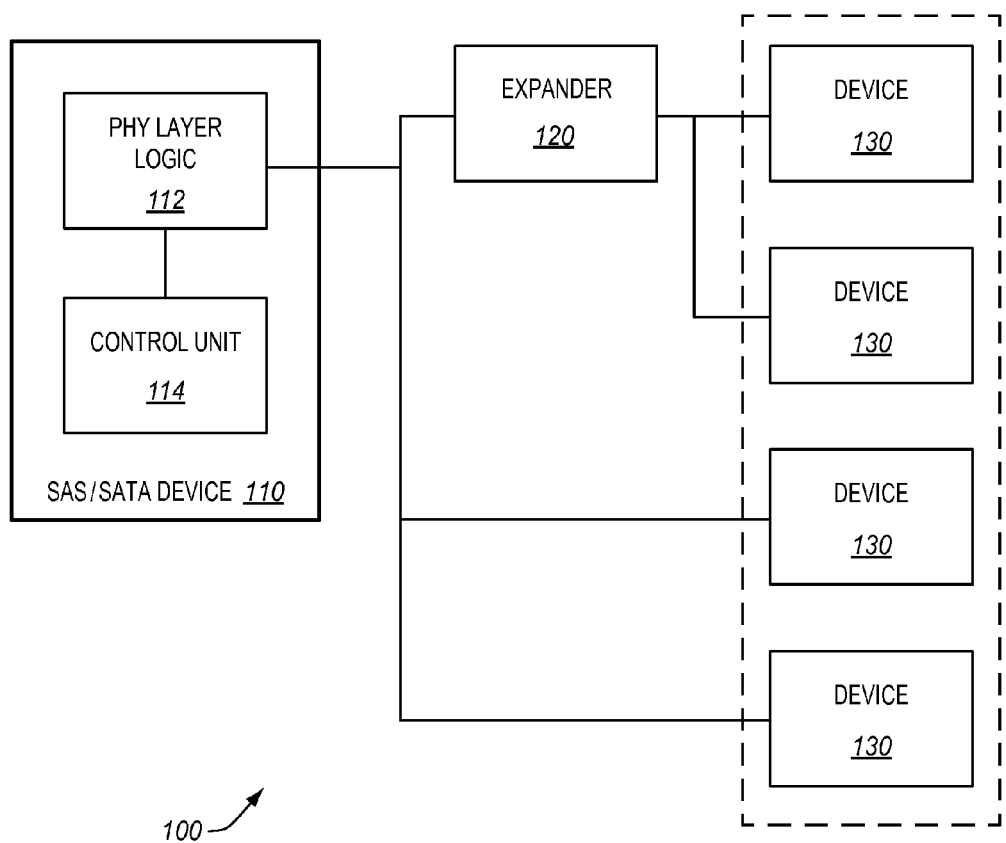
FIG. 1 is a block diagram of an exemplary SAS/SATA topology in accordance with features and aspects hereof.

FIG. 1 is a block diagram of an exemplary SAS and/or SATA (SAS/SATA) topology 100 in accordance with features and aspects hereof. SAS/SATA topology 100 may implement solely SAS devices, solely SATA devices, or some combination thereof. For example, SAS/SATA topology 100 may implement a number of storage controllers which are SAS compliant, each storage controller directing the operations of one or more SAS or SATA storage devices (e.g., hard drives, solid state drives, optical drives, etc.). According to FIG. 1, SAS/SATA device 110 includes PHY layer logic 112 for interacting with other devices as well as enhanced logic implemented at control unit 114. The enhanced logic of control unit 114 permits SAS/SATA device 110 to determine the degree to which coupled devices are compliant with protocols for at least one of SAS and SATA.

The SAS protocol standards are governed by the T10 committee of the InterNational Committee for Information Technology Standards, or INCITS, and include the working draft standards for SAS 2.1, Revision 04a, 5 Feb. 2010, herein incorporated by reference. The SATA protocol standards are governed by the Serial ATA International Organization (SATA-IO) and include Serial ATA Revision 3.0, 2 Jun. 2009, Gold Revision, herein incorporated by reference. SATA protocol compliance may be based upon compliance with AT Attachment standards governed by the T13 committee of INCITS, such as the Information technology—AT Attachment 8—ATA/ATAPI Command Set (ATA8-ACS) specification, Revision 4a, 21 May 2007, herein incorporated by reference.

SAS/SATA device 110 is coupled for communication with one or more devices 130. In this embodiment SAS/SATA device 110 is directly coupled with one set of devices 130, and is coupled with another set of devices 130 via expander 120. SAS/SATA device 110 will typically comprise a SAS initiator (e.g., a storage controller, a host bus adapter of a host system, etc.) but may comprise other SAS components (e.g., expanders). In this embodiment, a host system provides Input/Output (I/O) requests to SAS/SATA device 110 relating to the operations of the various components of SAS/SATA topology 100. SAS/SATA device 110 then fulfills the host I/O requests by performing SAS/SATA operations upon devices 130 utilizing PHY layer logic 112. PHYs and the PHY layer are described in the SAS 2.1 specification in at least the following locations: §3.1.164, §3.1.169, §4.1.2, and §6 et seq. PHYs and the PHY layer are described in the SATA 3.0 specification in at least the following locations: §5.1, §7 et seq., and §8 et seq.

Note that according to FIG. 1, devices 130 have been detected according to SAS/SATA protocols and appear to be compliant with SAS/SATA. However, the full extent to which devices 130 are actually compliant is unknown by SAS/SATA topology 100. This unknown level of compliance is indicated by the dashed line surrounding devices 130. In these circumstances, a prior SAS/SATA topology would simply assume that each of devices 130 is fully SAS/SATA compliant. However, as discussed above, simply assuming full compliance with the SAS/SATA protocols may lead to degraded performance as well as system instabilities. For example, unwanted run-time error handling resulting from such assumptions may potentially result in unrecoverable errors for a SAS/SATA topology.

Therefore, in order to address potential compliance issues with devices 130, SAS/SATA device 110 includes logic at control unit 114 for determining the degree of compliance of each device 130 with the SAS/SATA protocols. Determining the degree of compliance allows SAS/SATA device 110 to determine what type of SAS/SATA errors are predictably caused by a given device 130. For example, a SATA hard drive may send an Initial Frame Information Structure (FIS) at start-of-day, but may fail to send an Initial FIS upon link reset. This results in a protocol violation which would normally cause an error recovery process to be performed in the upper layers of the SAS/SATA protocol stack (e.g., layers at and above the link layer such as the transport layer or application layer). However, when control unit 114 determines that the SATA hard drive consistently throws the same error by failing to send an Initial FIS, it may beneficially alter subsequent communications with the hard drive to address the error. This may include reporting the discrepancy to a host system, disabling the SATA hard drive, or instructing upper protocol layers to forego error recovery procedures whenever the inconsistency occurs.

Control unit 114 includes, for example, circuitry implementing logic directing the operations of PHY layer logic 112. For example, the logic may be implemented at link layer logic associated with control unit 114. Implementing the logic at the link layer may allow control unit 114 to determine protocol compliance during link layer initialization or link reset processes for SAS/SATA device 110. Link layer initialization may include initialization of the hardware control structures that control the physical layer of SAS/SATA device 110, and may occur after Electrical Negotiation has completed between the two endpoints involved in a given connection. Testing for protocol compliance at the link layer may further help control unit 114 to determine that SAS/SATA errors at devices 130 result from consistent and predictable incidences of SAS/SATA non-compliance.

Implementing the testing at the link layer (as opposed to upper layers of the protocol stack) results in a number of benefits. For example, testing performed at the link layer is much faster than upper layer testing because the link layer is closer to the physical layer. Additionally, implementing the testing at the link layer allows for the testing logic to be implemented as a component of a link layer hardware block. Further, the link layer can manage detection of non-compliant devices without involving the upper layers, thereby freeing upper layer processing resources for other tasks. In contrast, application and/or transport layers of the SAS/SATA protocol stacks may interpret protocol non-compliance as unexpected communication errors because these layers may assume that all coupled devices are entirely SAS/SATA compliant. This would result in processing-intensive error recovery procedures each time the problem is encountered because the application and transport layers may assume that whenever there is an error, it results from an issue with the communication channel coupling the devices.

Using the enhanced logic of control unit 114, SAS/SATA device 110 may disable a non-compliant device or simply ignore a protocol inconsistency in the future instead of unnecessarily testing the integrity of a communication channel each time the protocol inconsistency is encountered. SAS/SATA device 110 may further report the protocol inconsistency to other SAS/SATA devices to allow them to take similar actions. This in turn provides a benefit to SAS/SATA topology 100 because SAS/SATA topology 100 does not waste processing resources error-checking predictable protocol compliance issues of devices 130.

Figure 2:
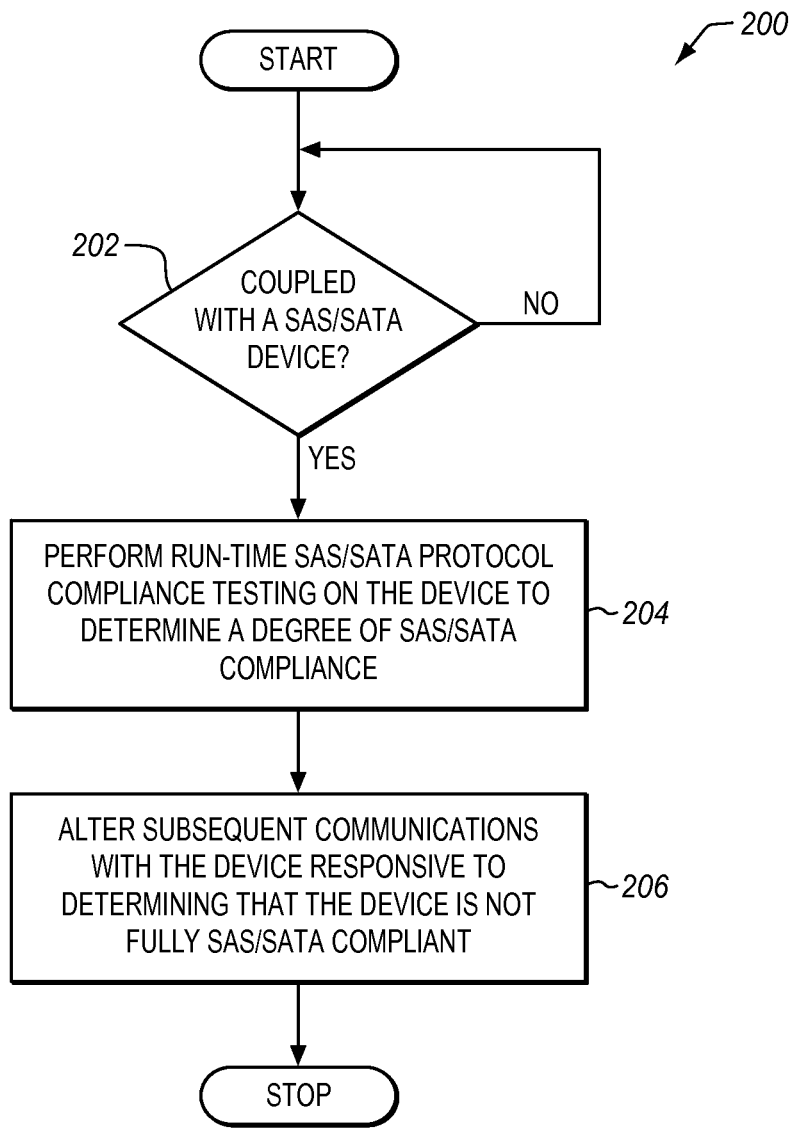
FIG. 2 is a flowchart describing an exemplary method in accordance with features and aspects hereof to determine a degree of SAS/SATA compliance of a device in a SAS/SATA topology.

FIG. 2 is a flowchart describing an exemplary method 200 in accordance with features and aspects hereof to determine compliance with standards for at least one of Serial Attached SCSI and Serial Advanced Technology Attachment (SAS/SATA). The method of FIG. 2 may be operable in a SAS/SATA topology such as described above with regard to FIG. 1.

Step 202 comprises determining, via control logic of a first device (e.g., circuitry implementing PHY and/or link layer logic directing the physical layer of the device), that the first device is coupled to a SAS/SATA second device. Note that for the purposes of this method, the phrase "SAS/SATA second device" is merely used to indicate that the second device is ostensibly compliant with SAS/SATA protocols, but the level of compliance is unknown. Determining that the second device is a SAS/SATA device may occur, for example, during link layer initialization and identification operations such as during initial discovery in a SAS topology or during other initialization processes.

Step 204 includes performing SAS/SATA protocol compliance testing on the second device to determine a degree of compliance with SAS/SATA protocols. This may be performed, for example, by utilizing control logic of the first device to engage in a series of test communications with the second device. The nature and type of SAS/SATA protocol testing may vary depending on the nature of the second device (e.g., storage controller, storage device, expander, host bus adapter, etc.) as well as the nature of the SAS/SATA topology in which the second device exists. For example, if the SAS/SATA topology implements a storage system, it may potentially utilize certain SAS/SATA functions more often than those used by a SAS/SATA topology implementing communications in a distributed computing system. The testing may further vary based upon the nature of the first device. For example, certain types of SAS/SATA protocol violations may be more harmful to one type of device than another (e.g., timing violations may be critical for one type of SAS/SATA device, but largely irrelevant to another).

Testing for protocol compliance may be a simple matter of performing a SAS/SATA operation upon the second device, and checking the responses of the second device against criteria required by SAS/SATA standards. In one embodiment, error-checking may also be performed to ensure that the detected SAS/SATA non-compliance issue is consistent and reproducible. In some embodiments, the compliance testing may be performed, for example, during the link layer initialization stage after a link reset occurs between the second device and the first device.

A person having ordinary skill in the art will appreciate that protocol compliance testing for SAS/SATA may be performed based upon any of the protocol standards defined for SAS, SATA, ATA8-ACS, etc. Because testing the full range of SAS and/or SATA protocol standards is an exhaustive process likely to utilize a great deal of system resources, it may be desirable to test SAS/SATA protocol compliance by testing a subset of the overall universe of protocol standards. As such, the specific protocol tests applied to a given SAS/SATA device may vary widely.

For example, if certain vendors are known, a priori, to manufacture devices that generally do not comply with certain portions of the SAS/SATA standards, the compliance testing may check each coupled SAS/SATA device for these common protocol compliance issues. In another example, the type and number of tests performed may vary based upon user preferences programmed into the testing device by a host system.

Any metric may be used to determine the degree of compliance of the second device with SAS/SATA standards. For example, the degree of compliance may be defined as the set of SAS/SATA non-compliance issues for the second device. This may include information explaining both the type and the extent of each of the non-compliance issues. In some embodiments, the degree of compliance may be classified based upon whether or not the second device will create SAS/SATA errors that result in system instabilities or lost data for the SAS/SATA topology.

Step 206 includes operating control logic of the first device to alter subsequent communications with the second device responsive to determining that the second device is not fully SAS/SATA compliant. Altering communications with the second device may comprise a variety of actions. For example, altering communications with the second device may comprise flagging the second device as an invalid SAS/SATA device, thereby removing the device from the SAS/SATA topology. This may be appropriate where the non-compliance of the second device is likely to impact the overall stability of the SAS/SATA topology. Another action includes storing information describing the non-compliance issues in a memory and dealing with the non-compliance issues based on programmed settings at the first device (e.g., settings programmed by a host system).

Figure 3:
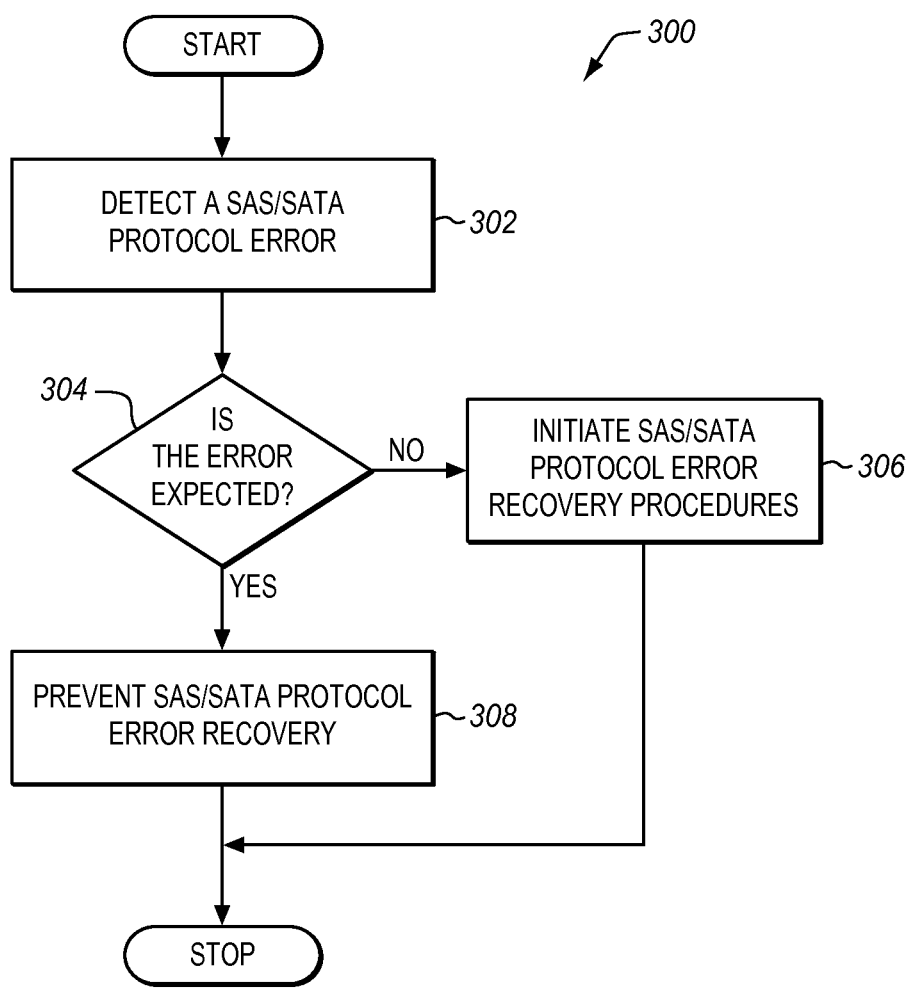
FIG. 3 is a flowchart describing an exemplary method of altering SAS/SATA communications with a non-compliant device in accordance with features and aspects hereof.

FIG. 3 is a flowchart describing an exemplary method 300 of altering SAS/SATA communications with a non-compliant device in accordance with features and aspects hereof. Assume, for this embodiment, that testing during link layer initialization has been completed, and that the SAS/SATA topology is currently operating to perform its intended functions. According to FIG. 3, step 302 includes detecting, in control logic of a first device, a SAS/SATA protocol error coming from a coupled device. For example, the error may comprise a coupled SATA device failing to send an Initial FIS upon reset, which may be a known and expected protocol violation based on the results of prior testing (e.g., that described with regard to method 200 of FIG. 2). Once the error has been detected, step 304 determines, by operation of the control logic of the first device, whether the error is an expected error or not. An expected error comprises, for example, a non-critical communication error resulting from known, previously determined SAS/SATA non-compliance issues. For example, an expected error for the purposes of FIG. 3 may be a known error that does not result in an instability for the SAS topology Timing for a read or write command may be non-compliant but still acceptable to the system because it will not impact the operation of the SAS/SATA topology. Thus, it may be allowed as an "expected error." On the other hand, timing for management functions may be important to the normal functioning of the topology and therefore it may be desirable to disable devices that result in such errors.

If the error is unexpected, then processing continues to step 306, wherein typical SAS/SATA protocol recovery procedures of the first device are implemented according to SAS/SATA guidelines. However, if the error qualifies as an expected error, then processing may alternatively continue to step 308, wherein standard SAS/SATA protocol error recovery procedures are prevented within the first device. This may be a benefit because for certain minor protocol violations, error recovery procedures are unnecessary and degrade system performance. Therefore, by ignoring the "minor" expected protocol violations, error recovery procedures may be skipped for the non-compliant device and system performance may be improved. In further embodiments, error recovery procedures at the upper layers may be altered for the non-compliant device. For example, the retry logic in an error recovery mechanism could be fine-tuned at run-time to test the non-compliant device a reduced number of times or to perform a reduced set of error-checking tests.

Further exemplary SAS/SATA compliance testing procedures are included in the following paragraphs. While each of the testing procedures described below discusses only one parameter measured during a protocol test, it will be understood that multiple parameters may be measured by a testing device at once to determine compliance with a given SAS/SATA standard. For example, the testing device may monitor the timing for receiving a response, the content of the response, etc. at the same time in order to determine compliance.

In a first example, testing is performed to ensure SAS compliance in opening an SSP connection in accordance with §7.17.1 of the SAS 2.1 specification. In this situation, a testing SAS device may send a connection request (i.e., an Open Address Frame) to a coupled device. If the coupled device does not transmit an RRDY within one millisecond of transmitting an $OPEN_{13}$ ACCEPT to the testing device, the coupled device may be flagged as non-compliant with the SAS protocol.

In a second example, testing is performed to ensure SAS compliance in SSP frame transmission and reception in accordance with §7.17.3 of the SAS 2.1 specification. In this situation, the testing device may send an SSP frame to a coupled device. If the coupled device does not respond to an SSP frame within one millisecond with either an acknowledgment (ACK) or a negative acknowledgment (NAK), the coupled device may be flagged as non-compliant with the SAS protocol.

In a third example, testing is performed to ensure SAS compliance in SMP frame transmission and reception in accordance with §7.19.1of the SAS 2.1 specification. In this situation, the testing device may send an SMP_REQUEST frame to a coupled device. If the coupled device does not respond with a single SMP_RESPONSE frame within 1900 microseconds, the device may be flagged as non-compliant with the SAS protocol.

In a fourth example, testing is performed to ensure ATA8-ACS compliance for Command Completion Time Limits (CCTL) in accordance with §7.40.3.2 of ATA8-ACS. In this example, a testing device sends a command to a coupled device along with a CCTL for completing the command If the coupled device does not report command completion within (CCTL*(IDENTIFY DEVICE data words (99:98)) microseconds, the device may be flagged as non-compliant with the ATA8-ACS protocol.

In a fifth example, testing is performed to ensure ATA8-ACS compliance for off-line modes in accordance with §7.56.5.3 of ATA8-ACS. A testing device may instruct a coupled device to perform a SMART EXECUTE OFF-LINE IMMEDIATE subcommand, and may then interrupt the coupled device with a host command that is not a SLEEP, SMART DISABLE OPERATIONS, SMART EXECUTE OFF-LINE IMMEDIATE, or STANDBY IMMEDIATE command If the coupled device does not suspend or abort the subcommand routine for the SMART EXECUTE OFF-LINE IMMEDIATE and proceed to service the host within two seconds after receipt of the new command, the coupled device may be flagged as non-compliant with the ATA8-ACS protocol.

In a sixth example, testing is performed to ensure SATA compliance for COMRESET in accordance with §7.5.1.2 of SATA 3.0 Gold Revision. In this situation, a testing device may detect a COMWAKE from a coupled device, and start transmitting D10.2 characters. If the coupled device does provide an ALIGN sequence to the testing device within 873.8 microseconds, the coupled device may be flagged as non-compliant with SATA.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A device compliant with a standard selected from the group consisting of Serial Attached SCSI (SAS) and Serial Advanced Technology Attachment (SATA), the device comprising:
   PHY layer logic operable to couple the device with another device;
   A control unit operable to direct operations of the PHY layer logic, further operable to determine that the other device is an SAS/SATA device, further operable to perform SAS/SATA protocol compliance testing on the other device to determine a degree of compliance of the other device with SAS/SATA protocol standards if the other device is determined to be an SAS/SATA device,
   the control unit further operable to alter subsequent communications with the other device in a protocol supported by the other device, based on the degree of compliance of the other device with SAS/SATA protocol standards,
   the control unit further operable to determine an expected protocol violation for the other device based on the protocol compliance testing, and further operable to alter communications with the other device by preventing standard SAS/SATA error recovery procedures when the expected SAS/SATA protocol violation for the other device is encountered during subsequent communications.

2. The SAS/SATA device of claim 1, wherein the control unit is further operable to alter communications with the other device by logically removing the other device from an SAS/SATA topology.

3. The SAS/SATA device of claim 2, wherein the control unit is further operable to remove the other device from the SAS/SATA topology by reporting to a host that the other device is not fully compliant with SAS/SATA protocol standards.

4. The SAS/SATA device of claim 1, wherein the control unit is further operable to perform the protocol compliance testing at a link layer, and further operable to perform the protocol compliance testing on the other device responsive to a link reset of the other device.

5. The SAS/SATA device of claim 1, wherein the type of the compliance testing performed on the other device and the manner in which communications are altered for the other device vary based upon user preferences programmed into the SAS/SATA device.

6. The SAS/SATA device of claim 1, wherein the compliance testing performed varies depending on a type of the other device.

7. The SAS/SATA device of claim 1, wherein the control unit is further operable to determine that the other device is an SATA device based on receipt of a Frame Information Structure (FIS) sent by the other device during link layer initialization.

8. A method operable in a first device for determining compliance of a second device with a standard selected from the group consisting of Serial Attached SCSI (SAS) and Serial Advanced Technology Attachment (SATA), the method comprising:
   determining, via the first device, that the second device is an SAS/SATA device;
   and performing, via the first device, SAS/SATA protocol compliance testing on the second device to determine a degree of compliance of the second device with SAS/SATA protocol standards if the other device is determine to be an SAS/SATA device; and
   altering subsequent communications with the second device is a protocol supported by the other device, based on the degree of compliance of the second device with SAS/SATA protocol standards, wherein altering communications with the second device comprises logically removing the second device from an SAS/SATA topology, wherein removing the second device from the SAS/SATA topology comprises reporting to a host that the second device is not fully compliant with SAS/SATA protocol standards.

9. The method of claim 8, further comprising determining an expected protocol violation for the second device based on the protocol compliance testing, wherein altering communications with the second device comprises preventing standard SAS/SATA error recovery procedures when the expected protocol violation for the second device is encountered during subsequent communications.

10. The method of claim 8, further comprising the control unit is further operable to perform the protocol compliance testing at a link layer, and further operable to perform the protocol compliance testing on the other device responsive to a link reset of the other device.

11. The method of claim 8, wherein the type of the compliance testing performed on the second device and the manner in which communications are altered for the second device vary based upon programmed user preferences.

12. The method of claim 8, wherein the compliance testing performed varies depending on a type of the other device.

13. The method of claim 8, further comprising determining that the second device is an SATA device based on receipt of a Frame Information Structure (FIS) sent by the second device.

14. A non-transistory computer readable medium embodying programmed instructions which, when executed by a processor, are operable for performing a method operable in a first device for determining compliance of a second device a standard selected from the group consisting of Serial Attached SCSI (SAS) and Serial Advanced Technology Attachment (SATA), the method comprising:
    determining, via the first device, that the second device is an SAS/SATA device;
    and performing, via the first device, SAS/SATA protocol compliance testing on the second device to determine a degree of compliance of the second device with SAS/SATA protocol standards if the second device is determined to be an SAS/SATA device; and
    altering subsequent communications with the second device in a protocol supported by the second device, based on the degree of compliance of the second device with SAS/SATA protocol standards, wherein removing the second device from the SAS/SATA topology comprises reporting to a host that the second device is not logically compliant with SAS/SATA protocol standards.

15. The medium of claim 14, the method further comprising determining an expected protocol violation for the second device based on the protocol compliance testing, wherein altering communications with the second device comprises preventing standard SAS/SATA error recovery procedures when the expected protocol violation for the second device is encountered during subsequent communication.

16. The medium of claim 14, wherein the type of compliance testing performed on the second device and the manner in which communications are altered for the second device vary based upon user preferences programmed into the SAS/SATA device.

17. The medium of claim 14, wherein the compliance testing performed varies depending on a type of the second device.

18. The medium of claim 14, wherein the control unit is further operable to determine that the second device is a SATA device based on receipt of a Frame Information Structure (FIS) sent by the second device during link layer initialization.

* * * * *